United States Patent [19]
Dadiomov

[11] Patent Number: 5,927,934
[45] Date of Patent: Jul. 27, 1999

[54] END EFFECTOR FOR A ROBOTIC ARM OF A DISK CERTIFIER

[75] Inventor: Alex Dadiomov, LaFayette, Calif.

[73] Assignee: Phase Metrics, Inc., San Diego, Calif.

[21] Appl. No.: 09/190,405

[22] Filed: Nov. 11, 1998

Related U.S. Application Data

[63] Continuation of application No. 08/740,648, Oct. 31, 1996.

[51] Int. Cl.$^6$ ................................................. B66C 1/100
[52] U.S. Cl. ............................................. 414/729; 901/45
[58] Field of Search ................................ 414/736, 941, 414/729; 901/45; 294/64.1

[56] References Cited

U.S. PATENT DOCUMENTS

| | | | |
|---|---|---|---|
| 4,582,191 | 4/1986 | Weigand | 414/941 X |
| 5,022,695 | 6/1991 | Ayers | 414/941 X |
| 5,620,406 | 4/1997 | Bae | 414/736 X |

*Primary Examiner*—Janice L. Krizek
*Attorney, Agent, or Firm*—Blakely Sokoloff Taylor & Zafman

[57] ABSTRACT

An apparatus and method for aligning an end effector that is attached to a robotic arm of a disk certification system. The end effector includes a disk paddle that is pivotally connected to an end effector housing. The end effector housing has a center opening that can receive a gripper subassembly. The disk paddle grabs a disk which has a center opening. The disk paddle is aligned by placing the end effector onto an alignment plate so that a center alignment pin of the plate is inserted into the center opening of the housing, and an outer alignment pin is inserted into the center opening of the disk. The end effector has an adjustment screw that can be adjusted to vary the position of the disk paddle so that the outer alignment pin is accurately positioned within the disk center opening. After alignment the end effector can be attached to the robotic arm.

7 Claims, 4 Drawing Sheets

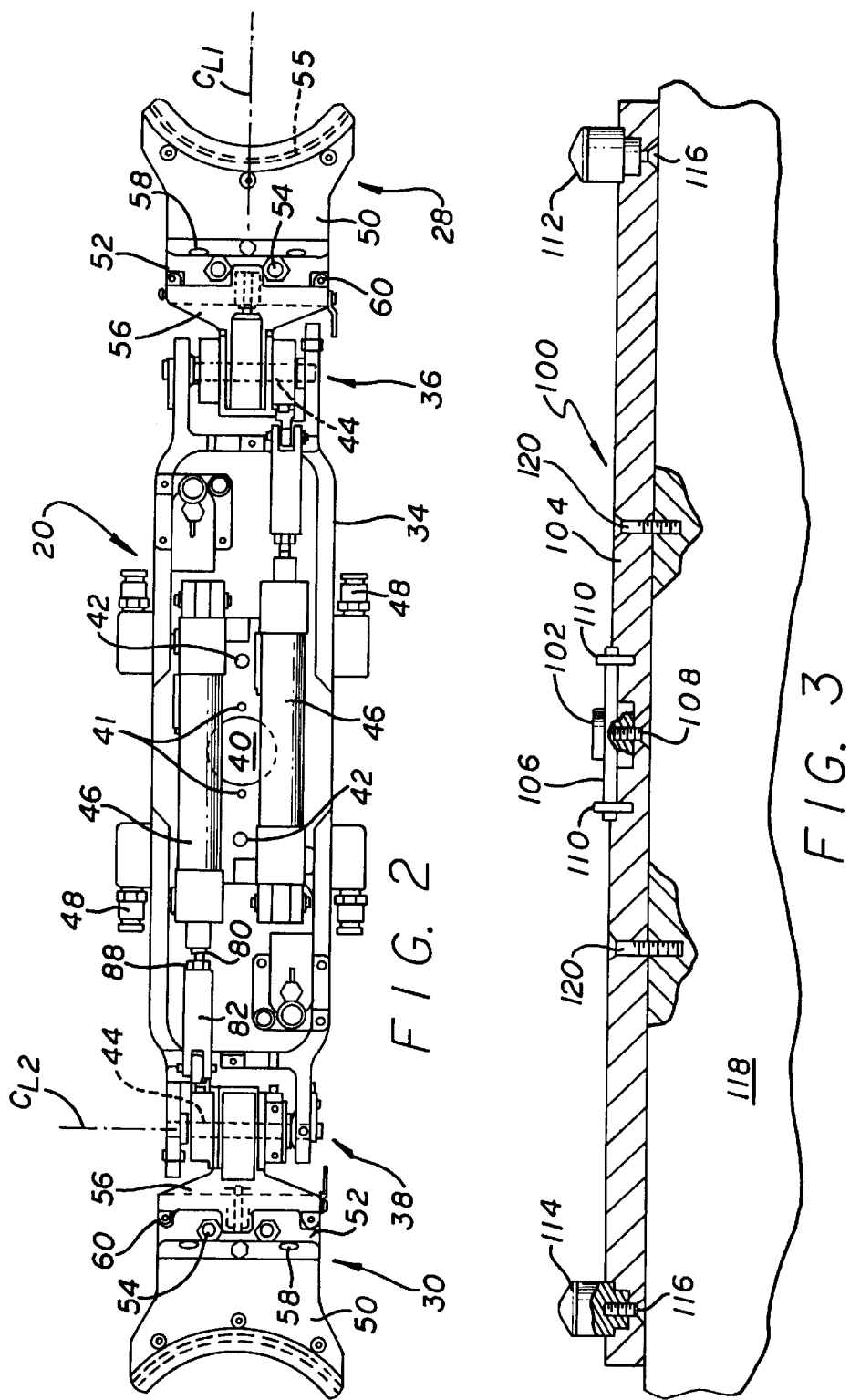

5,927,934

END EFFECTOR FOR A ROBOTIC ARM OF A DISK CERTIFIER

CROSS-REFERENCE TO RELATED APPLICATION

This application is a continuation application of application Ser. No. 08/740,648, filed on Oct. 31, 1996.

BACKGROUND OF THE INVENTION

1. Field of the Invention

The present invention relates to an end effector for a robotic system that certifies magnetic disks.

2. Description of Related Art

The magnetic disks of hard disk drives are typically tested in an apparatus commonly referred to as a disk certifier. The disk certifier has a spindle motor which spins a magnetic disk while a recording head writes and reads data from the disk. The disks are typically loaded onto the certifier by a robotic arm assembly which pulls a magnetic disk out of a disk tray and places the disk onto the spindle motor. When the certification process is completed the robotic assembly transfers the disk from the spindle motor back to a tray.

Disk certification stations typically contain a number of certifiers located about a single robotic arm assembly. The robotic assembly includes an end effector which has a pair of disk paddles that can transfer disks between the trays and the various certifiers.

When a disk certification system is installed the robotic arm assembly must be "taught" the movement between the certifiers and the disk trays. It has been found that the disk paddles of the robotic arm may become damaged during the installation of the system. The damaged paddle must be replaced with a new part. Installation of a new paddle may result in a different paddle location relative to the remaining portion of the end effector and robotic arm. The new paddle position necessitates a "reteaching" of the robotic arm. The reteaching process requires time and may result in damage to the system. It would therefore be desirable to provide an apparatus and method for aligning an end effector to accurately locate the disk paddles of the end effector.

SUMMARY OF THE INVENTION

The present invention is an apparatus and method for aligning an end effector that is attached to a robotic arm of a disk certification system. The end effector includes a disk paddle that is pivotally connected to an end effector housing. The end effector housing has a center opening that can receive a gripper subassembly. The disk paddle grabs a disk which has a center opening. The disk paddle is aligned by placing the end effector onto an alignment plate so that a center alignment pin of the plate is inserted into the center opening of the housing, and an outer alignment pin is inserted into the center opening of the disk. The end effector has an adjustment screw that can be adjusted to vary the position of the disk paddle so that the outer alignment pin is accurately position within the disk center opening. After alignment the end effector can be attached to the robotic arm.

BRIEF DESCRIPTION OF THE DRAWINGS

FIG. 2 is a top view of an end effector of the robotic disk certification system;

FIG. 3 is a side view of an alignment plate;

DETAILED DESCRIPTION OF THE INVENTION

Figure 1:
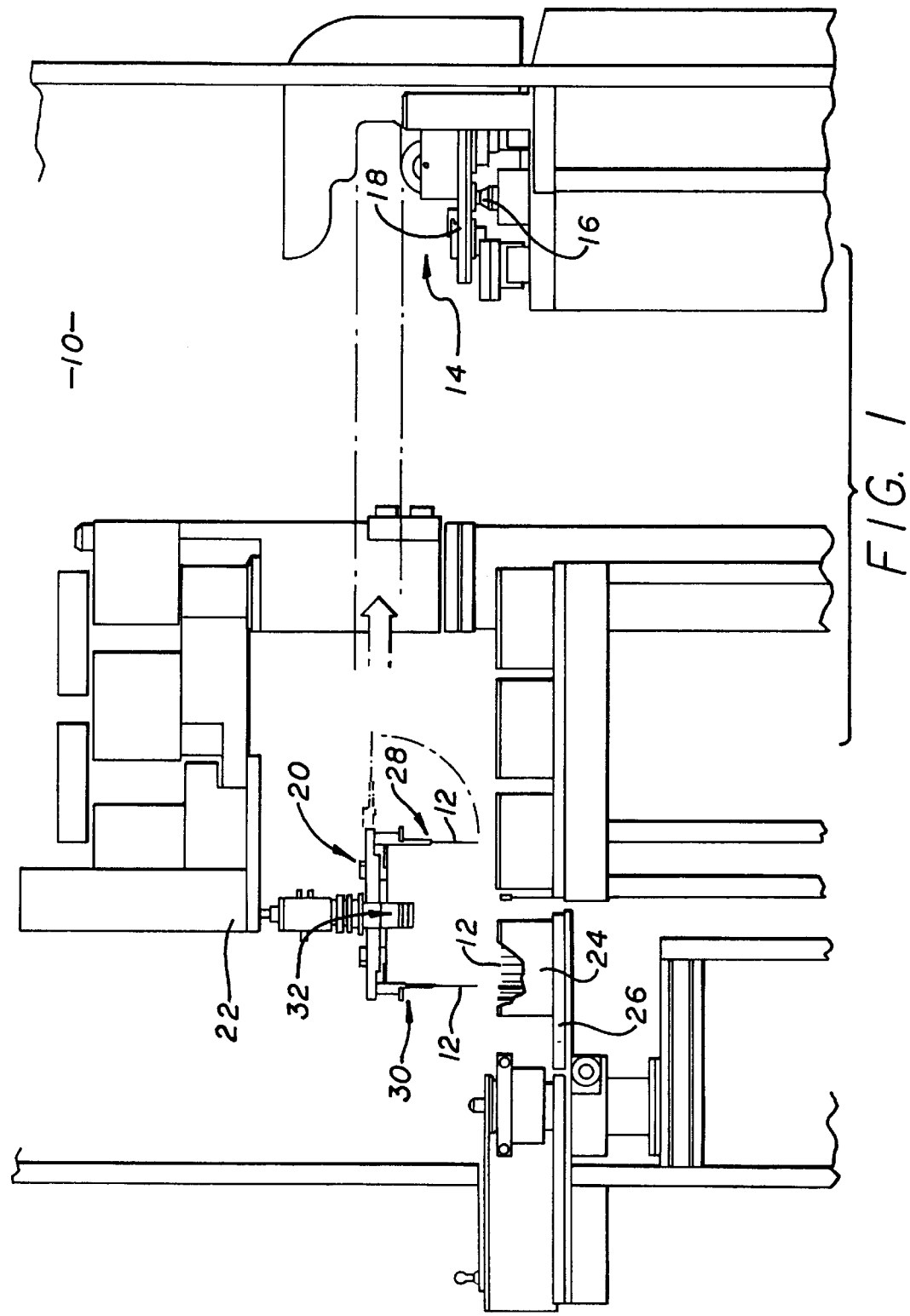
FIG. 1 is a side view of a robotic disk certification system.

Referring to the drawing more particularly by reference numbers, FIG. 1 shows a robotic disk certification system 10 of the present invention. The system 10 is used to test and certify magnetic disks 12 that are assembled into hard disk drives. The system 10 includes a disk certifier 14 that test and certifies the disks. The certifier 14 includes a spindle motor 16 that spins the disks 12 and a recording head 18 that can magnetize and sense the magnetic fields of the disks 12. Although one disk certifier 14 is shown and described, it is to be understood that the system 10 typically contains a plurality of certifiers 14 arranged in a circular pattern.

The system 10 further contains an end effector 20 that is mounted to a robotic arm 22. The disks 12 are typically stored in disk trays 24 that are supported by a conveyor 26. The end effector 20 grabs the disks 12, and the robotic arm 22 moves the disks 12 between the trays 24 and the certifiers 14.

The end effector 20 may have a first paddle assembly 28 and a second paddle assembly 30. The paddle assembles 28 and 30 are rotated to a vertical position to pull disks 12 out of the trays 24. The paddles 28 and 30 are then rotated to a horizontal position and moved to a certifier 14 to place a disk 12 onto the spindle motor 16. The end effector 20 may have a gripper subassembly 32 that moves the disk trays 24.

Figure 2A:
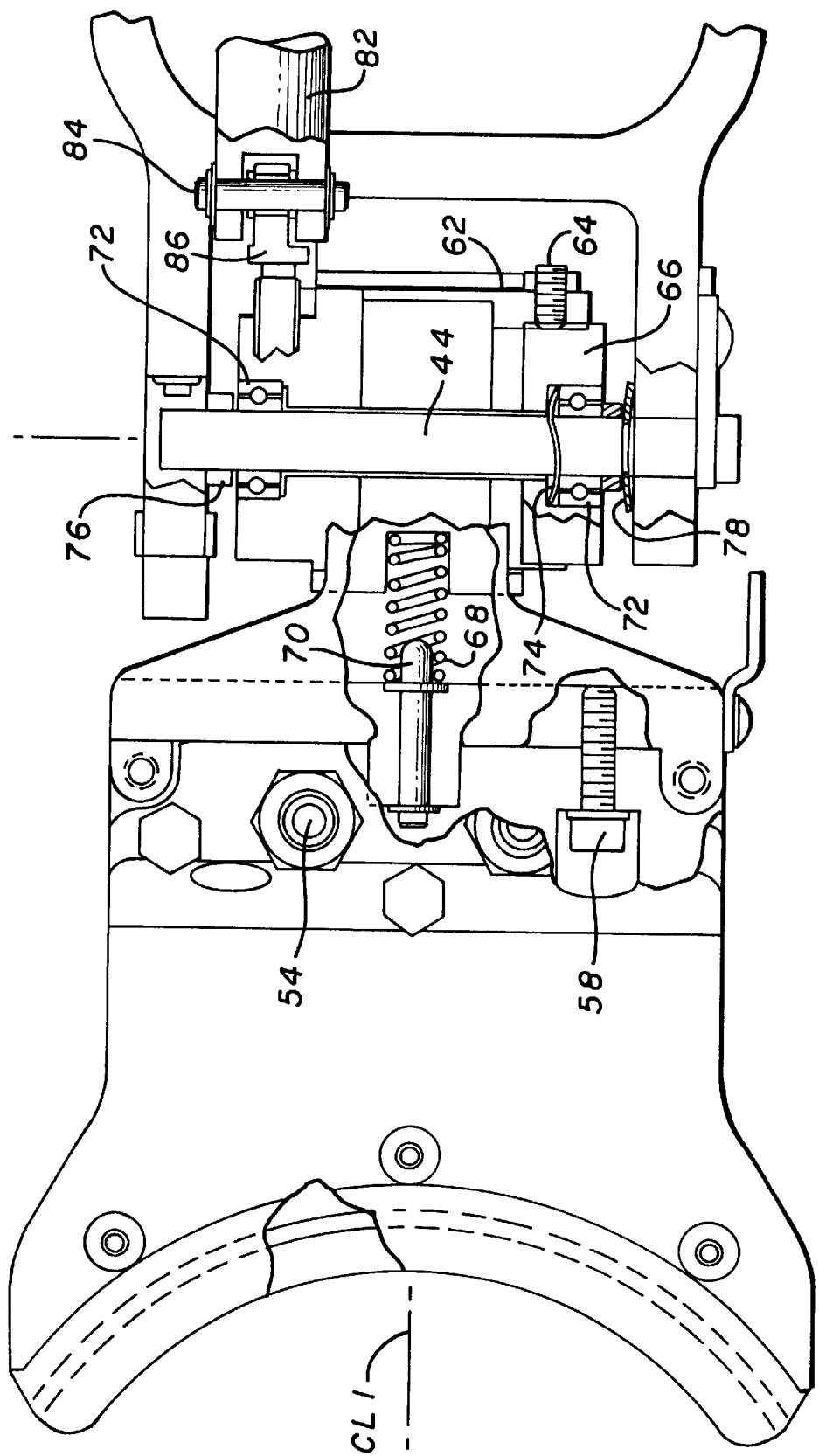
FIG. 2A is an enlarged view of FIG. 2.

FIGS. 2 and 2A show a preferred embodiment of the end effector 20. The end effector 20 includes a housing 34 which has a first end 36 and a second end 38. The housing 34 includes a center opening 40 that allows the gripper subassembly 32 to be attached to the end effector 20. Adjacent to the center opening 40 are a pair of gripper alignment openings 41 that align the gripper 32 with the housing 34. The housing 34 also has a pair of dowel alignment holes 42 used to align the end effector 20.

Each paddle assembly 28 and 30 is pivotally connected to an end of the housing 34 by a pin 44. A pair of actuators 46 are coupled to the paddle assemblies 28 and 30 to move the paddles between the vertical and horizontal positions. The actuators 46 are coupled to air pressure lines 48 which provide positive air pressure to actuate the devices 46. The actuators 46 preferably contain air cushions to reduce the velocity of the paddles and disks when rotating between the vertical and horizontal positions. Slowing down the paddle assemblies reduces the shock loads on the disks created by the sudden stopping motion of the paddles. The air cushion actuators 46 may be devices sold by SMC of Japan under the part designation CDJ2D16AA.

Each paddle assembly includes a disk paddle 50 that is attached to a paddle manifold 52. The manifold 52 directs air from a pair of vacuum pressure lines 54 to a slot 55 in the paddle 50. The vacuum pressure pulls and secures a magnetic disk 12 into the paddle 50.

The manifold 52 is attached to a pivot arm 56 by a pair of screws 58. The relative position of the paddle 50 about the centerline $C_{L1}$ of the pivot arm 56 is defined by a pair of screws 60. The screws 60 are typically set screws that can be adjusted by an operator to move and center the paddle 50 about the centerline $C_{L1}$.

The pivot arm 56 has a shoulder 62 that contains an adjustment screw 64. The adjustment screw 64 engages a pivot block 66 that rotates about the pin 44. The paddle assemblies each have a spring 68 and a pin 70 that bias the screw 64 into the block 66. The position of the pivot arm 56 and disk paddle 50 relative to the housing 34 can be varied by adjusting the screw 64.

The paddle assemblies 28 and 30 each contain a pair of bearings 72 which allow the pivot block 66 to rotate about the pin 44. The bearings 72 are preloaded by a wavy spring 74. The block 66 is pushed against a bushing 76 of the housing 34 by a beveled spring 78. The spring 78 and bushing 76 insure a minimal tolerance between the centerline $C_{L1}$ of the pivot arm 56 and paddle 50, and the longitudinal center axis of the housing 34 to insure that the paddles are aligned relative to the longitudinal axis.

The actuators 46 each have an output shaft 80 that is attached to a linkage element 82. Located at the end of each linkage element 82 is a pin 84. The pivot blocks 66 are also attached to linkage elements 86 that can rotate about the pins 84. The pins 84 and linkage elements 82 and 86 translate linear movement of the actuator shafts 80 into rotational movement of the pivot blocks 66 and paddles 50 so that the actuators 46 can move the paddles between the vertical and horizontal positions. Each output shaft 80 may contain a nut 88 that can be adjusted to vary the position of the paddle 50 about the longitudinal axis $C_{L2}$ of the pin 44.

FIG. 3 shows an alignment tool 100 that aligns the paddles 50 of the end effector 20. The tool 100 has a center alignment pin 102 mounted to a plate 104. The alignment pin 102 preferably extends from a disk shaped base 106 that is attached to the plate 104 by a screw 108. A pair of dowel pins 110 may also be attached to the base 106 and the plate 104. The tool 100 also has a pair of outer alignment pins 112 and 114 mounted to opposite ends of the plate 104 by screws 116. The alignment plate 104 may be fixed to a table 118 by screws 120 to secure the tool 100.

Figure 4:
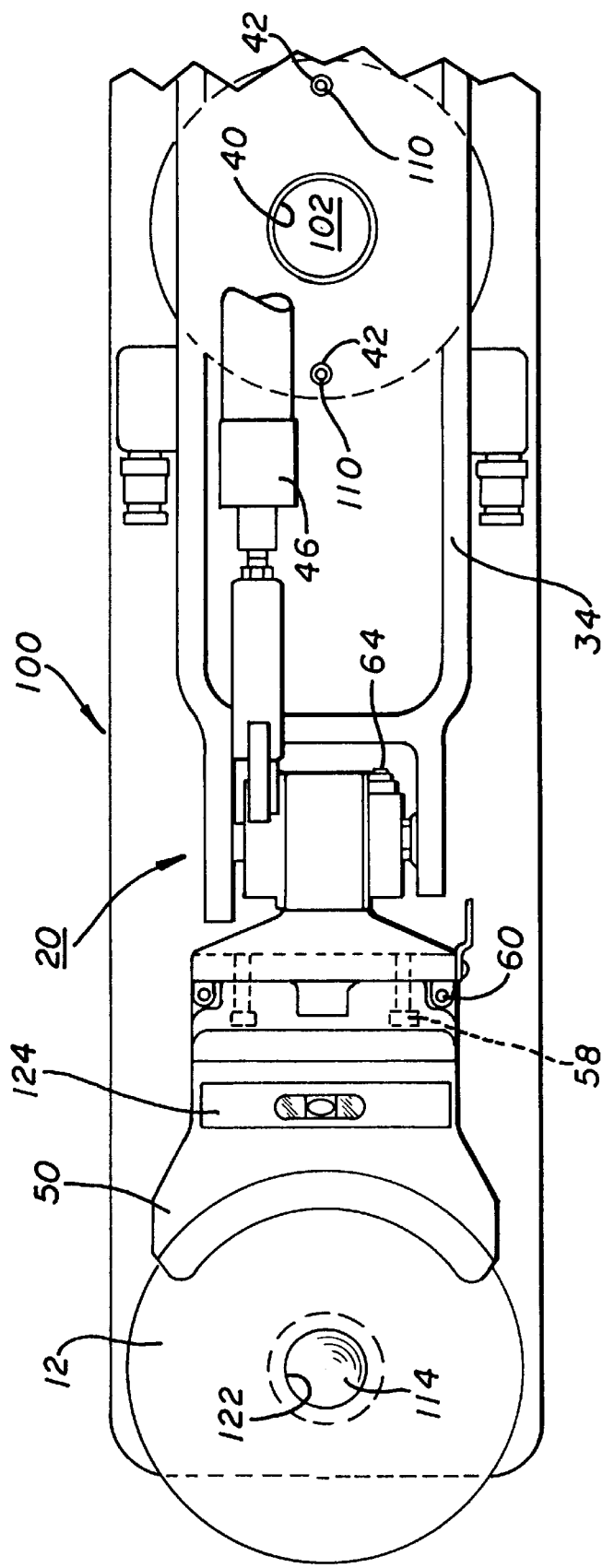
FIG. 4 is a top view showing the end effector mounted to the alignment plate.

As shown in FIG. 4, the tool 100 is used to align the paddles 50 of the end effector 20. The end effector 20 is placed onto the tool 100 so that the center pin 102 extends into the center opening 40 of the housing 34. The dowel pins 110 are also inserted into the alignment holes 42 of the housing 34 to align the end effector along the longitudinal axis of the tool 100. A vacuum is provided to the end effector so that each paddle 50 holds a disk 12. Positive pressure is also provided to the actuators 46 so that the paddles 50 and disks 12 are in a horizontal position. Each disk 12 has a center opening 122. When the paddles 50 are aligned the outer alignment pins 112 and 114 extend through the center openings 122 of the disks 12.

The level position of the paddles 50 can be checked with a mechanical level 124. The level position can be adjusted by loosening the screws 58 and adjusting the set screws 60. The screws 58 are retightened when the paddles 50 are level. The position of the paddles 50 relative to the housing 34 can be adjusted by the adjustment screws 64. If an outer alignment pin is not aligned with the center opening 122 of a disk 12 the adjustment screw 64 can be varied to move the paddle along the longitudinal axis of the tool 110 until the two features are centered. The nut 88 of the actuators 46 can also be varied to adjust the parallelism of the paddles 50 and disks 12 in the horizontal plane.

After the paddles 50 are aligned the end effector 20 can be removed from the tool 100. The gripper 32 is assembled to the housing 34 and the end effector 20 is subsequently attached to the robotic arm 22. The tool 100 insures that the paddles 50 are aligned each time an end effector 20 is mounted to the robotic arm 22.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An end effector for a robotic disk certification system, comprising:

a housing;

a pivot block that is pivotally connected to said housing;

a paddle that is attached to said pivot block;

a bushing that is coupled to said pivot block;

a spring that biases said bushing into said pivot block; and, a first adjustment screw that can be rotated to induce a corresponding movement of said paddle relative to said housing; and, an actuator that rotates said paddle relative to said housing.

2. The end effector as recited in claim 1, further comprising a gripper that is attached to said housing.

3. The end effector as recited in claim 1, further comprising a set screw that is adjusted to move said paddle relative to said housing.

4. The end effector as recited in claim 1, further comprising a nut that is coupled to said actuator to move said paddle relative to said housing.

5. An end effector for a robotic disk certification system, comprising:

a housing a pivot block that is pivotally connected to said housing;

a paddle that is attached to said pivot block;

an actuator that rotates said paddle relative to said housing;

a nut that is coupled to said actuator to move said paddle relative to said housing; and, a first adjustment screw that can be rotated to induce a corresponding movement of said paddle relative to said housing.

6. The end effector as recited in claim 5, wherein said actuator contains an air cushion.

7. The end effector as recited in claim 5, further comprising a gripper that is attached to said housing.

* * * * *